United States Patent
Claes

(10) Patent No.: US 9,473,508 B2
(45) Date of Patent: Oct. 18, 2016

(54) METHOD FOR THE PROTECTED DEPOSIT OF EVENT PROTOCOL DATA OF A COMPUTER SYSTEM, COMPUTER PROGRAM PRODUCT AND COMPUTER SYSTEM

(71) Applicant: Fujitsu Technology Solutions Intellectual Property GmbH, München (DE)

(72) Inventor: Heinz-Josef Claes, Nidderau (DE)

(73) Assignee: Fujitsu Technology Solutions Intellectual Property GmbH (DE)

(*) Notice: Subject to any disclaimer, the term of this patent is extended or adjusted under 35 U.S.C. 154(b) by 0 days.

(21) Appl. No.: 14/419,276

(22) PCT Filed: Oct. 31, 2013

(86) PCT No.: PCT/EP2013/072801
§ 371 (c)(1),
(2) Date: Feb. 3, 2015

(87) PCT Pub. No.: WO2014/068051
PCT Pub. Date: May 8, 2014

(65) Prior Publication Data
US 2015/0237057 A1 Aug. 20, 2015

(30) Foreign Application Priority Data
Nov. 2, 2012 (DE) .................. 10 2012 110 510

(51) Int. Cl.
*H04L 29/06* (2006.01)
*G06F 21/60* (2013.01)

(52) U.S. Cl.
CPC .......... *H04L 63/105* (2013.01); *G06F 21/604* (2013.01)

(58) Field of Classification Search
CPC .... H04L 29/06; H04L 63/105; G06F 21/604
USPC .............................. 726/23, 27; 711/216, 162
See application file for complete search history.

(56) References Cited

U.S. PATENT DOCUMENTS 5,032,979 A * 7/1991 Hecht .................. G06F 21/552
713/164
6,064,656 A 5/2000 Angal et al.
(Continued)

FOREIGN PATENT DOCUMENTS

JP   2000-29751   1/2000
JP   2007-128359  5/2007
(Continued)

OTHER PUBLICATIONS

L. Poettering et al., system journal, "Introducing the Journal," Nov. 2011, URL: https://docs.google.com/document/pub?id= 1IC9vOXj7j6cdLLxWEBAGRL6wl97tFxhjLUEHIX3MSTs&pIi=1.
(Continued)

*Primary Examiner* — Jeffrey Pwu
*Assistant Examiner* — Samuel Ambaye
(74) *Attorney, Agent, or Firm* — DLA Piper LLP (US)

(57) ABSTRACT

A method for the protected deposit of event protocol data of a computer system provides access control which prohibits access to event protocol data in the computer system and also performs:
  reading event protocol data generated in the computer system,
  sequential assignment of individual data sections of the read event protocol data to one of at least two categories in accordance with predetermined criteria,
  merging the categorized data sections for each respective category into a sub-file, and
  separate storage of created sub-files and setting up an access option to access the individual sub-files.

18 Claims, 2 Drawing Sheets

(56) References Cited

U.S. PATENT DOCUMENTS

2005/0071650 A1    3/2005    Jo et al.
2007/0011746 A1    1/2007    Malpani et al.
2009/0012970 A1*   1/2009    Ziv ................... G06F 17/30705

FOREIGN PATENT DOCUMENTS

| JP | 2008-269419 | 11/2008 |
|----|-------------|---------|
| WO | 2008/026238 | 3/2008  |

OTHER PUBLICATIONS

Wikipedia, "Syslog-ng," Stand: Jul. 8, 2012, URL: http://en.wikipedia.org/w/index.php?title=Syslog-ng&oldid=506219694.
Wikipedia, "Unix Dateirecht," Stand: Oct. 22, 2012, URL: http://de.wikipedia.org/w/index.php?title:Unix-Dateirechte&oldid=109609803.
"The syslog-ng 3.0 Administrator Guide," URL: http://www.balabit.com/support/documantation/syslog-ng-v3.0-guide-admin-en_0.pdf.

* cited by examiner

METHOD FOR THE PROTECTED DEPOSIT OF EVENT PROTOCOL DATA OF A COMPUTER SYSTEM, COMPUTER PROGRAM PRODUCT AND COMPUTER SYSTEM

TECHNICAL FIELD

This disclosure relates to a method for the protected deposit of event protocol data of a computer system and to a computer program product containing a computer program which, when run on a computer system, performs a method of this type. The disclosure also relates to a computer system designed to perform a method of this type.

BACKGROUND

System managers or administrators have at their disposal access options to the hardware or access rights to the software of a computer system to maintain and manage the computer system to ensure error-free operation of the computer system or error-free usage of the computer system by end users. It is problematic that the extended access rights of system managers or administrators generally also permit access to personal or confidential data stored on the computer system being operated. For instance, administrators have the capability of reading confidential data of end users.

Typical approaches to ensure confidentiality of information or data protection in general are established by virtue of the fact that specific directives (processes which are to be observed) and rules (commands and prohibitions) are established, e.g., contractually between the individual user groups of a computer system. However, a problem with these approaches is that user groups having extended access rights, e.g., employees of a software service provider, may be criminals, or are being blackmailed or bribed. Therefore, technical measures are required which prevent access to confidential data within a computer system.

In particular, so-called "event protocol" data or log data can be the subject of unauthorized access by system managers or administrators. Event protocol data are generated continuously or at predetermined time intervals by specific entities (applications, system programs, system hardware, etc.) in a computer system and are stored in a memory of a computer system.

The event protocol data can contain, e.g., information relating to specific system statuses of the computer system, optionally predetermined error protocols intended for a system manager or administrator. On the other hand, the event protocol data can also contain information to be assigned, e.g., to a specific end user as information, e.g., specific business transactions, personal customer data, credit card numbers, etc. In general, the information last referred to is confidential and intended only for the respective end user or, for reasons of possible traceability, for restricted groups of persons, e.g., for account managers. For legal reasons, e.g., for reasons of investigations conducted by the police or public prosecutor's office, it is often necessary to be able to trace specific transactions in the computer system. In general, however, access by a system manager or an administrator to the confidential customer information is to be prohibited.

Technical features of an encryption of event protocol data permit only access protection which is limited or can be bypassed because the data can be decrypted or reconstructed by expert users or can be present in unencrypted form by reason of suitable measures during processing thereof in the computer system (e.g., in the processor core of the computer system). Consequently, measures for encryption of the event protocol data are not adequate on their own to ensure increased data protection.

Therefore, it could be helpful to provide a method, a computer program product and a computer system which by technical measures permit protected deposit of event protocol data of a computer system and prohibit forbidden access to confidential information.

SUMMARY

I provide a method for the protected deposit of event protocol data (Log_A_B) of a computer system, wherein an access control is provided which prohibits access to the event protocol data (Log_A_B) in the computer system and also performs: reading of event protocol data (Log_A_B) generated in the computer system, sequential assignment of individual data sections (A1, A2, B1, B2) of the read event protocol data (Log_A_B) to one of at least two categories (A, B) in accordance with predetermined criteria, merging of the categorized data sections (A1, A2, B1, B2) for each respective category (A, B) to sub-data (Log_A, Log_B), separate storage of all created sub-data (Log_A, Log_B), and setting up a specific access option separately for the respective sub-data (Log) A, Log_B) in accordance with predetermined user groups.

I also provide a computer program product containing a computer program which, when run on a computer system, performs the method for the protected deposit of event protocol data (Log_A_B) of a computer system, wherein an access control is provided which prohibits access to the event protocol data (Log_A_B) in the computer system and also performs: reading of event protocol data (Log_A_B) generated in the computer system, sequential assignment of individual data sections (A1, A2, B1, B2) of the read event protocol data (Log_A_B) to one of at least two categories (A, B) in accordance with predetermined criteria, merging of the categorized data sections (A1, A2, B1, B2) for each respective category (A, B) to sub-data (Log_A, Log_B), separate storage of all created sub-data (Log_A, Log_B), and setting up a specific access option separately for the respective sub-data (Log) A, Log_B) in accordance with predetermined user groups.

I further provide a computer system including an access control unit for controlled access to event protocol data (Log_A_B) of the computer system, wherein the access control unit performs the method for the protected deposit of event protocol data (Log_A_B) of a computer system, wherein an access control is provided which prohibits access to the event protocol data (Log_A_B) in the computer system and also performs: reading of event protocol data (Log_A_B) generated in the computer system, sequential assignment of individual data sections (A1, A2, B1, B2) of the read event protocol data (Log_A_B) to one of at least two categories (A, B) in accordance with predetermined criteria, merging of the categorized data sections (A1, A2, B1, B2) for each respective category (A, B) to sub-data (Log_A, Log_B), separate storage of all created sub-data (Log_A, Log_B), and setting up a specific access option separately for the respective sub-data (Log) A, Log_B) in accordance with predetermined user groups.

Figure 1:
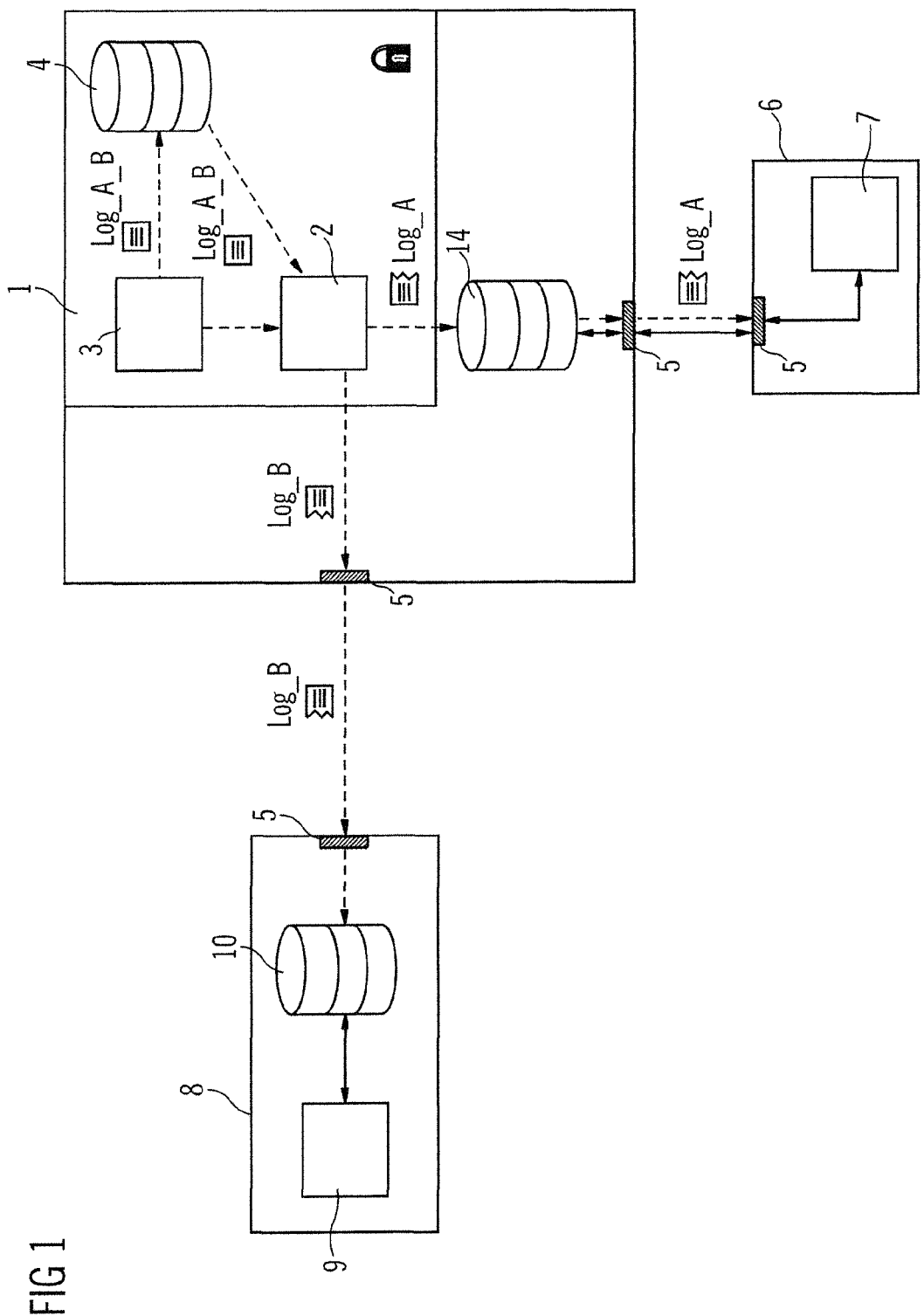
FIG. 1 shows a schematic view of a computer network infrastructure for implementing my methods.

LIST OF REFERENCE NUMERALS 1 computer system
2 access control unit
3 system unit
4 first memory in the computer system
5 input/output interface
6 administrator computer system
7 administrator tool
8 client computer system
9 client application
10 memory in the client computer system
14 second memory in the computer system
Log_A_B event protocol data
Log_A, Log_B sub-files
A1, #A2, #B1, #B2 checksum
A1, A2, B1, B2 line entry in the event protocol data
A, B category

DETAILED DESCRIPTION

I provide a method wherein an access control is provided which prohibits access to the event protocol data in the computer system and also performs the following steps:
  reading of event protocol data generated in the computer system,
  sequential assignment of individual data sections of the read event protocol data to one of at least two categories in accordance with predetermined criteria,
  merging of the categorized data sections for each respective category to sub-data,
  separate storage of all created sub-data, and
  setting up of a specific access option separately for the respective sub-data in accordance with predetermined user groups.

A method of this type permits separation of generated event protocol data into different categories, wherein specific information in the event protocol data is assigned to these predetermined categories and stored as sub-data. General access to the originally generated event protocol data as raw data in the computer system is prevented by the access control. Predetermined users are permitted only specific, separate access to the respectively categorized information of the created sub-data.

Advantageously, specific information from the event protocol data can thus be assigned to or withheld from specific access modalities or access options. The advantage of this type of method is that only specific information is accessible to specific users or user groups. Therefore, it is feasible that a first user group has exclusive access to first sub-data having information of a first specified category, whereas a second user group has exclusive access to second sub-data having information of a second category different from the first category. Alternatively or in addition, it is possible to provide a third user group having access to a plurality or all of the created sub-data.

Therefore, it is feasible that event protocol data which contain, e.g., information relating to specific system statuses as well as information relating to customer data are separated by the explained method into a category "system statuses" and another category "customer data." The event protocol data are not restricted to such information. Other information produced during operation of a computer system can also be incorporated. The data sections having information relating to the system statuses can be merged and separately stored, that is to say saved, as a category of sub-data and the data sections having information relating to customer data can be merged and separately stored, that is to say saved, as another category of sub-data. Different access options or access rights can be assigned to the created sub-data. In this manner, only predetermined users also actually acquire access to the information predetermined for them.

For example, end customers or account managers can access the category "customer data," whereas system managers or administrators have access to the category "system status." In this manner, it is possible to ensure reliable system management of the computer system while at the same time guaranteeing technically enhanced data protection of confidential information.

It is also feasible that event protocol data contain only data sections of one category. In this case, the above method can also be applied, wherein all data sections are then assigned to this one category. This represents, e.g., a case in which all of the information is accessible for a specific user group. However, it is crucial that sequential reading and categorizing of the event protocol data are actually performed and, therefore, in the case of only one category, the option of separating data sections of different categories also exists. The categorized data sections can be encrypted accordingly.

In this context, the term "sub-data" is to be understood to mean data of one category which have been separated out from the original event protocol data by the access control. The sub-data can be present as a continuous data stream and can be deposited or stored accordingly. Alternatively or in addition, it is also possible for the created sub-data to be stored (i.e., saved) as "sub-files," that is to say files of a predetermined category, or to be transmitted via a network.

The explained method can be performed, e.g., by an access control in a computer system which operates as a so-called "log converter." The log converter can be implemented, e.g., as system software or else also within a microcontroller module as a logical sequence program or as a combination of both. The access control can be integrated as an access control unit exclusively in the computer system which holds available the event protocol data to be processed. However, it is also feasible for the access control to comprise a plurality of subprograms or software agents or microcontrollers arranged on a plurality of computer systems within a computer network infrastructure to permit processing of the event protocol data and access to the created categories of sub-data.

The log converter performs the explained method steps in an automated manner. This means that event protocol data are transferred to the log converter to be read-in or are tapped directly by the log converter at predetermined interfaces in the computer system, e.g., during the procedure of writing the event protocol data to a memory in the computer system. Subsequently, the log converter sequentially inspects the individual data sections of the read event protocol data and assigns the data sections to individual categories on the basis of predetermined criteria. Finally, the categorized data sections are merged into the respective sub-data and stored. Therefore, the information from the event protocol data is channelled accordingly in dependence upon the prepared categories.

One possible application of the explained method is advantageously possible within a secured or protected computer network infrastructure, a so-called "sealed infrastructure." Generally, a computer system can be encapsulated in such an infrastructure such that access to specific data or all data in this computer system (that is to say logical access to the computer system) and/or mechanical access to the hardware of the computer system (that is to say physical access) are not possible or are only possible to a limited extent. Such systems can be configured such that only specific data and information can be relayed by the system in a unidirectional manner outwardly within a network structure.

In particular, the recording and depositing of event protocol data within a computer system, which was hitherto associated with the risk of unauthorized access to confidential information, can be improved by the method because the access to the original event protocol data is prohibited and access to predetermined information by predetermined user groups can be channelled and restricted.

Advantageously, the created sub-data or sub-files can be locally stored in the computer system and/or can be distributed to a further computer system by a network infrastructure. This means that, depending upon access protection or access rights, restricted access to the computer system is possible for the purpose of retrieving locally stored sub-data. The sub-data or sub-files are distributed in an automated manner to other computer systems or access to the computer system is prohibited in general, wherein access to created sub-data is permitted merely via a network at a predetermined location in the network unlike the computer system, e.g., another computer system.

Advantageously, the created sub-data of at least one category can be encrypted. Preferably, all of the created sub-data of all categories are encrypted. For encryption purposes, those skilled in the art can make use of established methods of cryptography, e.g., awarding public and private keys for predetermined numbers of users (e.g., PGP with RSA or DH/DSS) or else also alternatively or in addition providing encrypted transmission channels within a computer network, e.g., in accordance with the so-called "transport layer security" standard (TLS).

Advantageously, the individual data sections of the event protocol data are categorized on the basis of at least one of the following criteria:
specific syntactic instructions,
time stamps,
predefined terms,
patterns, that is to say predetermined, interpretable patterns within the data sections,
variables, and
data types.

The criteria produce evaluation options for classifying read-in data sections into the predefined categories. Therefore, it is possible, e.g., that when event protocol data are being read-in an access control of the type explained above performs an interpretation of the data with regard to at least one of the aforementioned criteria. This can be performed in a similar manner to an analysis by a lexical scanner (lexer). If one of the criteria is recognized as a data pattern, then the data pattern can be assigned to a specific category by logical processing.

An access control of the type explained sequentially scans the individual data sections of the event protocol data, interprets them and assigns them to the predetermined categories on the basis of the recognized criteria. For example, the term "log-on" followed by a time stamp in a data section of the event protocol data can make the access control recognize that the data section is a system procedure, namely, e.g., a log-on procedure by a user on the computer system. As a consequence, the access control will assign this data section to a category "system status" (see above).

On the other hand, e.g., the term "MasterCard" followed by predefined variables or sequences of numbers can make the access control recognize that this data section is a recorded customer procedure (e.g., an ordering procedure) so that the access control assigns this data section to a category "customer data" (see above). Therefore, after the aforementioned data sections have been assigned to different categories, they can also be channelled for different user groups and separated in terms of their access.

Therefore, it is feasible, e.g., that only the user groups of the system managers or administrators can retrieve the information relating to the specific log-on procedure, the end customer or account manager can retrieve only the information relating to the executed user procedure from corresponding sub-data. The respective other user group does not have access to the sub-data for which it is prohibited.

Advantageously, the individual categories are defined by different user groups and/or different access rights to the computer system. As already explained, the categories can be defined, e.g., according to system manager or administrators and user managers or end users, e.g., account managers and customers. However, it is also feasible that different access rights are awarded to the users of a predetermined user group. Therefore, e.g., in the case of end users, there can be those who have extended access rights and those who have restricted access rights. These access rights can determine a specific access to corresponding sub-files of the separated event protocol data.

I also provide a computer program product and a computer system. The computer program product contains a computer program which, when run on a computer system, performs the above methods.

The computer system comprises an access control unit for the controlled access to event protocol data of the computer system, wherein the access control unit is designed to perform a method of the type explained.

Advantageous developments and further aspects are disclosed in the description of the figures hereinafter. The aspects which have already been explained will now be explained in greater detail with reference to several drawings.

FIG. 1 illustrates a schematic view of a computer network infrastructure for implementing my methods for the protected deposit of event protocol data. As shown in FIG. 1, the computer network infrastructure comprises by way of example three computer systems, namely a first computer system 1, a client computer system 8 and an administrator computer system 6. This configuration is illustrated by way of example only, wherein the computer network infrastructure can also comprise further computer systems, in particular further client computer systems or another configuration.

The computer system 1 forms the central system of the infrastructure. The computer system 1 can comprise, e.g., a computing or data server of a service provider, wherein at least one application or system program 3 can be executed within a protected or encapsulated system structure of the computer system 1 (denoted by a lock symbol). However, it is also possible that the component 3 as shown in FIG. 1 comprises, e.g., a processor core, possibly combined with a working memory. In general, the component 3 in the computer system 1 is to be understood to be a component which, during continuous operation of the computer system 1, generates predetermined event protocol data Log_A_B.

This event protocol data Log_A_B constitute a protocol of all events in the protected system structure of the computer system 1. Therefore, the event protocol data Log_A_B can comprise, e.g., system procedures (possible accesses to the computer system 1, statuses of continuous operating system entities or virtual machines, hardware resource procedures and the like) and specific confidential user information (user names, information relating to business transactions or electronic payment transactions, passwords, other private data and the like). However, the event protocol data Log_A_B are not restricted to such information. Other information produced during operation of the computer system 1 can also be incorporated.

The crucial fact in the context of the system illustrated in FIG. 1 is that the event protocol data Log_A_B which are generated in the unit 3 are held available in their generated original form exclusively in the protected or encapsulated system structure (see lock) of the computer system 1. Therefore, the event protocol data Log_A_B can be written, e.g., by the unit 3 to a first memory 4 of the computer system 1 within the protected system environment and can be stored at this location. Furthermore, the event protocol data Log_A_B can be transferred either directly from the unit 3 to an access control unit 2 or alternatively can be read out by the access control unit 2 from the first memory 4 of the computer system 1. This is illustrated by two alternative paths between the unit 3 and the access control unit 2 or between the first memory 4 and the access control unit 2.

However, it is also feasible to arrange the memory 4 outside the protected system structure, wherein in this case the event protocol data Log_A_B are stored in encrypted form to prevent access to the event protocol data Log_A_B. It is feasible that the event protocol data Log_A_B are encrypted by the access control unit 2.

The access control unit 2 can comprise, e.g., a log converter to process the event protocol data Log_A_B, the mode of operation of which is explained below. The access control unit 2 is also located within the protected system structure or system environment of the computer system 1.

The protected system structure of the computer system 1 can be, e.g., a sealed infrastructure. This means that access by users within the entire system from the outside to the protected system structure of the computer system 1, in particular in accordance with the configuration in FIG. 1 to the components 2, 3 and 4, is not possible or is only possible to a very restricted extent. Therefore, e.g., access to the protected system structure from the outside may generally be prohibited. In this case, during operation of the system, executing application or system components 2, 3, 4 within the computer system 1 operate independently without an external access option or intervention option.

However, in another alternative case limited access to the protected system structure of the computer system 1, in particular to selected components and units within the protected system structure, can be prepared. Therefore, it is feasible that a user of the entire system has access, e.g., to individual components of the unit 3, e.g., application or system programs to execute them, to manage or maintain them for other users. However, such a user may be prohibited from accessing other components such as, e.g., data in the first memory 4.

A common feature of all feasible examples is that access to the generated event protocol data Log_A_B in the protected or encapsulated system structure is generally prohibited. This is ensured by the access control unit 2. As already explained, the event protocol data Log_A_B can contain the most varied information which is intended to be confidential and thus accessible only for predetermined users. In this manner, it is prohibited for an unauthorized user to acquire access to information in the event protocol data Log_A_B not intended for that user.

Access protection to the protected or encapsulated system structure of the computer system 1 can be accomplished, e.g., by virtue of the fact that all of the input interfaces are not accessible from the outside (so-called "port filtering") or the individual components within the protected system structure deny access by protocol assistance (e.g., suppress the exchange of information on the transfer layer of a transfer protocol).

The mode of operation of the access control unit 2 within the protected system structure of the computer system 1 will now be explained.

As already explained, the event protocol data Log_A_B are transferred to the access control unit 2 or are tapped by the access control unit 2 accordingly from the component 3 or from the first memory 4. The access control unit 2 then reads in the event protocol data Log_A_B and sequentially assigns individual data sections of the event protocol data Log_A_B to one of, e.g., two categories A and B in accordance with predetermined criteria. The predetermined criteria can be selected, e.g., such that specific information of the event protocol data Log_A_B, e.g., system information, is allocated to a category A (administrators) and other information of the event protocol data, e.g., user information, is allocated to a second category B (users).

Then, the categorized data sections are divided in the access control unit 2 into corresponding sub-data which correspond to the specified categories A and B. This means that the access control unit 2 generates, e.g., sub-data Log_A of a category A and sub-data Log_B of a category B with the respectively assigned information. Finally, the generated sub-data can be stored accordingly, e.g., as sub-files so that only authorized users acquire access to the individual sub-files.

This is illustrated in FIG. 1 by virtue of the fact that the sub-file Log_A is transferred by the access control unit 2 to a second memory 14 of the computer system 1 and is stored (optionally in encrypted form) at that location, wherein in this case the second memory 14 is arranged by way of example outside the protected system structure but within the computer system 1. However, it is also feasible to transfer (broadcast) to the network the data or files Log_A in encrypted form without a specifically addressed destination computer system or to provide the second memory 14 outside the computer system 1 in a further computer system or in a destination computer system. The sub-file Log_A stored in the second memory 14 can then be retrieved, e.g., via the administrator computer system 6 and an administrator tool 7 configured therein (which can be part of an access control by the access control unit 2) by corresponding communication via input and output interfaces 5.

In this manner, an administrator can use the administrator computer system 6 to load the sub-file Log_A, which is predetermined for his user group, from the computer system 1 and then evaluate it. It is thereby feasible that by the administrator computer system 6, e.g., restricted access to further components of the computer system 1 in addition to the second memory 14 is configured to allocate, e.g., to the protected system structure, in particular a system unit 3, specific commands, e.g., to perform a reset or restart routine. However, access to the original event protocol data Log_A_B by the administrator computer system 6 is excluded by the access control unit 2, as already explained.

In addition to the further transfer of the sub-file Log_A, a further transfer of the other sub-file Log_B to a client computer system 8 can also be performed in the access control unit 2, as illustrated in FIG. 1. The sub-file Log_B is transferred by the computer system 1 via the interface communication 5 to the client computer system 8 and stored in a memory 10 at that location. Then, a client application 9 (which can be part of an access control by the access control unit 2) can access the memory 10 and open, read and evaluate the second sub-file Log_B. The client computer system 8 can likewise be constructed as a protected system structure so that only authorized users of the client computer system 8 have access to the sub-file Log_B. Alternatively or in addition, the memory 10 can also be configured outside the client computer system 8. In this case, the sub-file Log_B is preferably stored in encrypted form to prohibit unauthorized access.

Access by users of the client computer system 8 to the sub-file Log_A transferred to the administrator computer system 6 is not provided. Reverse access by users of the administrator computer system 6 to the sub-file Log_B sent to the client computer system 8 is also not provided. This ensures that predetermined information intended only for authorized users is also only relayed to the respective user groups (clients B or administrators A). Access to the original event protocol data Log_A_B in the protected system structure of the computer system 1 (see lock) is prevented by the access control unit 2.

All of the transfers of the sub-files Log_A and Log_B from the access control unit 2 in the computer system 1 to the individual further computer systems 6 and 8 can be advantageously performed in encrypted form. For encryption or decryption purposes, those skilled in the art can thereby make use of the most varied cryptography techniques or encryption algorithms, e.g., through the awarding of public and private keys. As already explained, an encryption can be performed preferably by the access control unit 2.

Figure 2:
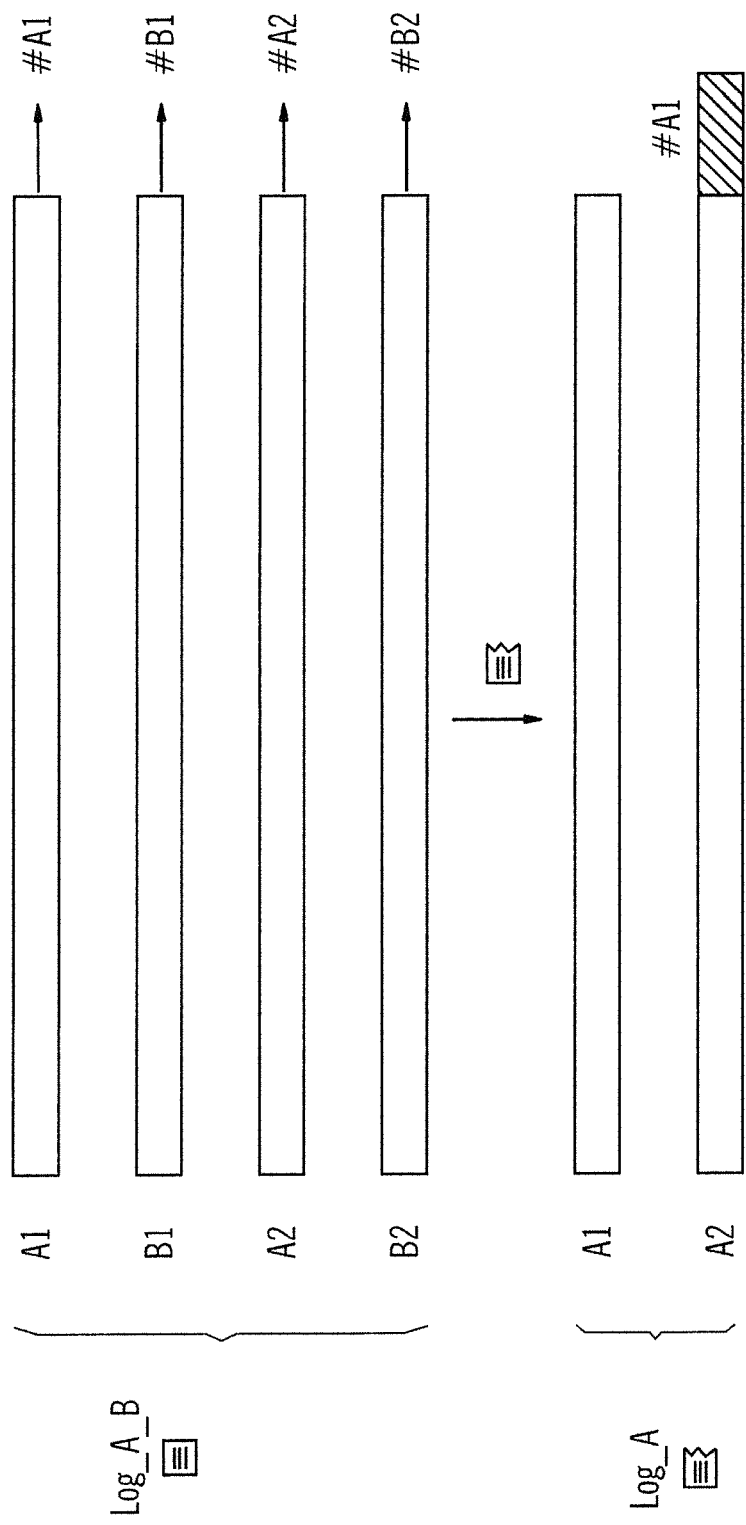
FIG. 2 shows a schematic view of a categorization of event protocol data in accordance with my methods.

FIG. 2 illustrates by way of example processing of event protocol data Log_A_B within an access control unit 2 as shown in FIG. 1.

The event protocol data are provided, e.g., in the form of a text file, in which a plurality of line entries A1, B1, A2, B2 and the like are recorded. The individual line entries comprise by way of example on the one hand information which reflects a specific system status and is provided for a first user group (e.g., administrators) and on the other hand information which contains specific user information and is therefore intended for a second user group (e.g., end users). Consequently, line entries of the event protocol data Log_A_B are associated either with a first category A or a second category B. By way of example in FIG. 2, line entries of the first category A and of the second category B alternate and thus form the entries A1, B1, A2, B2 and the like.

The access control unit 2 as shown in FIG. 1 can read-in the individual line entries and assign them either to the category A and/or the category B on the basis of predetermined criteria. Predetermined criteria are, e.g., specific syntactic instructions, time stamps, predefined terms, patterns, variables or data types. Therefore, e.g., the first line entry A1 can contain an item of information relating to a specific error code "Error XYZ." On the basis of this syntax or these specified terms, the access control unit 2 recognizes that entry A1 is a system entry and assigns this entry to the category A.

The line entry B1 can contain, e.g., information relating to users or e-commerce conducted by users, e.g., "name: ABC, customer number: 123." On the basis of this information, the access control unit 2 recognizes that line entry B1 is a user entry and logically assigns this to the category B. This occurs in a similar manner with the subsequent line entries.

Subsequently, all of the line entries, that is to say data sections, of the event protocol data Log_A_B are merged according to the respective category into sub-data, by way of example into a sub-file. FIG. 2 illustrates by way of example the merging of all of the line entries of the category A into the sub-file Log_A which comprises by way of example the line entries A1 and A2. It is not compulsory to merge the entries into one sub-file. It is also feasible that the categorized data sections are configured as a continuous data stream. Merging into sub-files can be performed, e.g., at another location in the entire system (e.g., in another computer system).

Moreover, for each line entry A1, B1, A2, B2 and the like a checksum #A1, #B1, #A2, #B2 and the like is generated. The checksum can comprise a hash value of a respective line entry which marks the respective line entry biuniquely. Furthermore, the checksum of a data section is added to a subsequent data section of the respective category. This is shown by way of example in FIG. 2, in which the checksum #A1 of the line entry A1 has been added in the sub-file Log_A to the line entry A2. A corresponding line entry A3 would then acquire the checksum #A2 of the line entry A2 and the like. In this manner, a so-called concatenated list of the line entries A1, A2 and the like is formed to prevent individual line entries from being deleted unnoticed.

In the event that a line entry is deleted, the checksum attached to the next line entry (and constituting the checksum of the deleted line) no longer corresponds to the checksum of the preceding, still existing line entry. This can be verified, e.g., by the access control unit 2 or the client application 9 (see FIG. 1) and thus constitutes a marker that at least one line entry has been deleted. This prevents it from being possible to subsequently tamper with the generated sub-file Log_A unnoticed. An unauthorized user is, e.g., thus prohibited from starting a specific system procedure which he is actually not allowed to start (e.g., performing a business transaction using another user's stolen credit card number), wherein subsequently the incriminating line entry in the corresponding sub-file is deleted. This is because the concatenated list ensures that the deletion is noticed and as a consequence, e.g., a specific warning message can be output. Incidentally, the originally generated event protocol data still exists in the protected system structure of the computer system 1 as shown in FIG. 1 and can be read out, e.g., by authorities tasked with ensuring safety and security (the police or public prosecutor's office) in the event that a violation has been reported. It is advantageous to establish a continuous counter for the individual line entries so that the number of missing lines can be ascertained if necessary.

It is likewise feasible to encrypt the individual line entries of a sub-file Log_A as shown in FIG. 2 so that the respective checksum, e.g., #A1, is encrypted. This has the additional advantage that any tampering with line entries via the subsequent reconstruction of a corresponding checksum can also be avoided because the encryption ensures that the actual checksum value can only be ascertained with great difficulty.

By the additional or alternative generation of a random number attached either to the entire sub-file Log_A or else to each line entry A1, A2 and the like, it is additionally possible to afford further protection against, or to render more difficult, the improper reconstruction or decryption of the corresponding sub-file. In this case, known ways of extending key lengths, e.g., an extension from 128 bit to 256 bit, i.e., key lengths of several bytes, can come into consideration.

The method and the entire system permit the protected deposit of event protocol data of a computer system, wherein by an access control the originally generated event protocol data can be split up into a plurality of sub-files. The individual sub-files are relayed exclusively to authorized user groups. The relayed data are optionally encrypted. However, access to the original event protocol data is prohibited. As a consequence, it is possible to use technical means to ensure that confidential information remains protected against access by unauthorized persons.

The illustrated computer systems, product and methods have been selected merely by way of example, wherein in particular alternatives of an entire system as shown in FIG. 1 are feasible.

The invention claimed is:

1. A method for the protected deposit of event protocol data (Log_A_B) of a computer system, comprising providing a protected system structure in a computer system and providing a component within the projected system structure, wherein the component generates predetermined event protocol data (Log_A_B), and the event protocol data (Log_A_B) are held available in their generated original form exclusively in the protected system structure of the computer system, and providing an access control that generally prohibits access to the event protocol data (Log_A_B) in the computer system and also performs:
  reading of the generated event protocol data (Log_A_B);
  sequential assignment of individual data sections (A1, A2, B1, B2) of the read event protocol data (Log_A_B) to one of at least two categories (A, B) in accordance with predetermined criteria;
  merging of the categorized data sections (A1, A2, B1, B2) for each respective category (A, B) to sub-data (Log_A, Log_B);
  separate storage of all created sub-data (Log_A, Log_B); wherein the sub-data (Log_A, B) corresponding to different categories (A, B) are stored at different storage locations outside the protected system structure; and
  setting up a specific access option separately for the respective sub-data (Log_A, Log_B) of each respective category (A, B) in accordance with predetermined user groups such that only authorized users acquire access to the individual sub-data (Log_A, Log_B).

2. The method according to claim 1, wherein the event protocol data (Log_A_B) generated in the computer system are read out from at least one event protocol file.

3. The method according to claim 1, wherein the created sub-data (Log_A, Log_B) are locally stored in the computer system and/or distributed to a further computer system by a network infrastructure.

4. The method according to claim 1, wherein the created sub-data (Log_A, Log_B) of at least one category (A, B) are encrypted.

5. The method according to claim 1, wherein the individual data sections (A1, A2, B1, B2) of the event protocol data (Log_A_B) are categorized on the basis of at least one criteria selected from:
  specific syntactic instructions,
  time stamps,
  predefined terms,
  patterns,
  variables, and
  data types.

6. The method according to claim 1, wherein the individual categories (A, B) are defined by different user groups and/or different access rights to the computer system.

7. The method according to claim 1, wherein for each data section (A1, A2, B1, B2) of a respective category (A, B) a checksum (#A1, #A2, #B1, #B2) is generated.

8. The method according to claim 7, wherein the checksum (#A1, #A2, #B1, #B2) of a data section (A1, A2, B1, B2) is added to a subsequent data section (A1, A2, B1, B2) of the respective category (A, B).

9. The method according to claim 7, wherein in addition to the checksum (#A1, #A2, #B1, #B2) for each data section (A1, A2, B1, B2) of a respective category (A, B) a random number is generated.

10. A computer program product comprising a non-transitory computer-readable medium containing a computer program which, when run on a computer system, performs the method according to claim 1.

11. A computer system comprising an access controller that controls access to event protocol data (Log_A_B) of the computer system, wherein the access controller performs the method according to claim 1.

12. The method according to claim 8, wherein in addition to the checksum (#A1, #A2, #B1, #B2) for each data section (A1, A2, B1, B2) of a respective category (A, B) a random number is generated.

13. The method according to claim 2, wherein the created sub-data (Log_A, Log_B) are locally stored in the computer system and/or distributed to a further computer system by a network infrastructure.

14. The method according to claim 2, wherein the created sub-data (Log_A, Log_B) of at least one category (A, B) are encrypted.

15. The method according to claim 3, wherein the created sub-data (Log_A, Log_B) of at least one category (A, B) are encrypted.

16. The method according to claim 2, wherein the individual data sections (A1, A2, B1, B2) of the event protocol data (Log_A_B) are categorized on the basis of at least one criteria selected from:
  specific syntactic instructions,
  time stamps,
  predefined terms,
  patterns,
  variables, and
  data types.

17. The method according to claim 3, wherein the individual data sections (A1, A2, B1, B2) of the event protocol data (Log_A_B) are categorized on the basis of at least one criteria selected from:
  specific syntactic instructions,
  time stamps,
  predefined terms,
  patterns,
  variables, and
  data types.

18. The method according to claim 4, wherein the individual data sections (A1, A2, B1, B2) of the event protocol data (Log_A_B) are categorized on the basis of at least one criteria selected from:
  specific syntactic instructions,
  time stamps,
  predefined terms,
  patterns,
  variables, and
  data types.

* * * * *